(12) United States Patent
Melo et al.

(10) Patent No.: US 6,241,400 B1
(45) Date of Patent: Jun. 5, 2001

(54) CONFIGURATION LOGIC WITHIN A PCI COMPLIANT BUS INTERFACE UNIT WHICH CAN BE SELECTIVELY DISCONNECTED FROM A CLOCKING SOURCE TO CONSERVE POWER

(75) Inventors: Maria L. Melo; Khaldoun Alzien, both of Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/995,762

(22) Filed: Dec. 22, 1997

(51) Int. Cl.[7] .................................................. G06F 13/38
(52) U.S. Cl. ............................................................ 395/309
(58) Field of Search .................................. 710/129, 117, 710/126, 137

(56) References Cited

U.S. PATENT DOCUMENTS

| | | | |
|---|---|---|---|
| 5,511,203 | * 4/1996 | Wisor et al. | 713/300 |
| 5,781,783 | * 7/1998 | Gunther et al. | 713/320 |
| 5,910,876 | * 6/1999 | Sharma et al. | 361/86 |
| 5,926,629 | * 7/1999 | Gulick | 710/117 |
| 5,983,303 | * 11/1999 | Sheafor et al. | 710/126 |
| 5,983,325 | * 11/1999 | Lewchuk | 711/137 |

* cited by examiner

Primary Examiner—Robert Beausoleil
Assistant Examiner—Tim Vo
(74) Attorney, Agent, or Firm—Kevin L. Daffer; Conley, Rose & Tayon P.C.

(57) ABSTRACT

A computer having a bus interface unit coupled between a CPU bus and a PCI bus and/or a bus interface unit coupled between a PCI bus and memory and or I/O space. The clocking to the configuration space of the bus interface unit can be inhibited to conserve power in two ways. The first approach relies on an input/output address space containing a configuration address register. An enable bit or flag within the configuration address register can be set to allow a determination of the various PCI devices and to configure those devices linked to the PCI bus. Subsequent to computer boot up or initialization, the enable bit can be disabled to disallow further accesses to the configuration address space of the PCI device or PCI compliant bus interface unit. Disabling the enable bit further inhibits or disconnects a clocking signal from sequential logic within the configuration address space to minimize power consumption of the north bridge during its normal operation. In the second approach, the clocking to the configuration space is automatically enabled and disabled as needed by the bus interface unit to transfer data to and from its configuration registers. Removing the clocking signal, in either approach, minimizes power consumption allowing additional functions to be added to the mobile PC.

14 Claims, 5 Drawing Sheets

CONFIGURATION LOGIC WITHIN A PCI COMPLIANT BUS INTERFACE UNIT WHICH CAN BE SELECTIVELY DISCONNECTED FROM A CLOCKING SOURCE TO CONSERVE POWER

BACKGROUND OF THE INVENTION

1. Field of the Invention

This invention relates to a computer and, more particularly, to a configuration register space in a peripheral component interface ("PCI") compliant bus interface unit which can be selectively disconnected from a clocking signal to save power whenever the configuration space is not being accessed.

2. Description of the Related Art

Power consumption in an electronic device is always a significant concern. Longevity of the power supply, heat dissipation, physical size, weight, efficiency and other related characteristics are paramount in designing the electronic device. These characteristics become exceptionally critical when the device is a self-sufficient portable unit.

A portable unit is one in which power is supplied from a battery during times when the unit is decoupled from its main power source, e.g., a 110 volt ac supply. In some instances, the battery functions as an auxiliary power source to ensure critical circuits are kept alive and to retain information stored in memory. In other instances, the battery functions as the main power source to fully power the device in its operational state.

Various types of portable units can be powered from a battery including, for example, a computer. Modern portable computers are called upon to perform at increasingly higher levels. For example, a high performance portable computer may employ a high speed CPU and multiple buses between the CPU and numerous input/output devices. Multiple buses may include a CPU local bus connected directly to the CPU, a peripheral bus connected to slower input/output devices, and a mezzanine bus connected between the CPU local bus and the peripheral bus. The peripheral bus can be classified as, for example, an industry standard architecture ("ISA") bus, and enhanced ISA ("EISA") bus or a microchannel bus. The mezzanine bus can be classified as, for example, a peripheral component interface ("PCI") bus to which higher speed input/output devices can be connected.

A bus interface unit is used to allow I/O and memory devices to communicate with the bus they reside on. A bridge is a device that connects two busses together. According to known terminology, the bus interface unit coupled between the CPU bus and the PCI bus is often termed the "north bridge". Similarly, the bus interface unit between the PCI bus and the peripheral bus is often termed the "south bridge".

Any PCI device bus interface unit contains a substantial amount of sequential logic. The sequential logic is clocked by a clocking signal either generated within the PCI device or forwarded to the PCI device. A substantial portion of the sequential logic is dedicated to latches and/or flip-flips within the PCI device attributed to an input/output address space, a memory address space and a configuration address space.

In each instance, the address spaces embodying latches and flip-flops define a set of registers which are clocked by the clocking signal. When clocked, the sequential logic consumes a substantial amount of power. This is especially profound when considering the high speed at which the north bridge must operate relative to a high speed CPU bus and PCI bus. When the computer is first powered on, reset or booted, configuration software scans the PCI bus, or busses, to determine what PCI devices exist and the particular configuration requirements of each device. This process is referred to as scanning, walking, probing, or enumerating the bus. In order to facilitate this operation, all PCI devices including the north bridge must implement a base set of configuration registers defined within the configuration address space. Accordingly, software drives initialization and configuration via a separate configuration address space containing a substantial amount of sequential logic clocked by the clocking signal. The PCI specification allocates a maximum of 256 addressable bytes for configuration purposes. Typically, a PCI device requires approximately 128 bytes of configuration registers for the purpose of configuration. Each register consumes power during configuration. However, clocks to those registers remain on even after configuration. Clocking the configuration space after configuration has ended unnecessarily consumes an exorbitant amount of power within the PCI device.

It would be desirable to produce a portable computer which can accommodate a PCI device with specific power management modes of operation. An improved PCI device is therefore needed which can selectively inhibit a clocking signal to a portion of sequential logic within the PCI device. Disconnecting or inhibiting the clocking signal must occur in a dynamic fashion to be an effective power management tool. Dynamic disconnect occurs to only portions of the sequential logic which are not called upon for operation. Thus, the improved power management mechanism takes into account times when configuration cycles on the PCI bus are running, enabled or disabled. When the configuration cycles are not currently running on the PCI bus or disabled, the improved power management mechanism advantageously inhibits power drain caused by clocking signals forwarded to the configuration address space within the PCI device. Reducing power within PCI devices would reduce the power consumption in high performance personal computers allowing additional functions to be added to the mobile PC.

SUMMARY OF THE INVENTION

The problems outlined above are in large part solved by an improved power management techniques hereof. Power management involves reducing power in the PCI devices by disconnecting or inhibiting a clocking signal to a portion of the PCI device after configuration or initialization of the computer has ended. The first approach is specific to a north bridge. In the first approach a mechanism is used to monitor the CPU bus for accesses to a particular address location within the input/output address space of the CPU. When access to that space occurs, and when an enable flag is set within a register of that space, conversion or translation into a configuration access can occur upon the PCI bus. More specifically, by setting the enable flag or bit location to an enable value, a configuration cycle is generated upon the PCI bus and a configuration space (configuration registers) within the north bridge is clocked by the clocking signal. However, when the enable flag or bit location contains a value indicating a "disable" condition, configuration cannot occur regardless of whether the configuration address register within the input/output space of the processor is accessed. Absent configuration, the configuration space within the north bridge is disconnected or inhibited from receiving the clocking signal. Advantageously, the enable flag or value within the enable bit determines whether the clocking signal will clock the configuration space. If the enable flag or bit value is disabled, then power will not be consumed by at least a substantial portion of sequential logic residing within the configuration space.

Significant power savings within the north bridge can occur by monitoring accesses to the CPU input/output address space and, more particularly, by monitoring the enable flag or enable bit within a configuration address register within the input/output address space written to or modified by the CPU. Modification of the enable flag occurs either during a boot procedure, or possibly during subsequent procedures in which one or more PCI devices are re-configured. By writing an enable value to the enable flag, more PCI devices are re-configured. By writing an enable value to the enable flag, configuration or re-configuration of a PCI device can occur; however, writing a disable value to the enable flag or enable bit after configuration or re-configuration will disable future, inadvertent re-configurations. It is therefore desired that the enable flag be set (or enabled) only when configuration is desired and then disabled immediately thereafter. This can occur in software, or possibly through a time-out procedure. When disabled, the value residing within the enable bit is transferred to a logic gate or gates used to gate off a clocking signal forwarded to specific sequential logic found primarily in the configuration space of the north bridge. Another approach can be utilized by any PCI device including the north bridge. This approach uses a mechanism to monitor the PCI bus for configuration cycles. When configuration read or writes to the internal configuration address space are detected on the PCI bus, the configuration space (configuration registers) within the PCI device is clocked by the clocking signal. Wait states are added on the PCI bus (by not asserting TRDY__) to insure that the clock signal to the configuration registers is clean when data needs to be written to or read from the configuration registers. The clocking signal is removed as soon as the data is written to or read from the configuration register thus maximizing the power savings.

Broadly speaking, the present invention contemplates a computer. The computer comprises a bus interface unit which includes a configuration address space, and a clocking signal. In a first approach the configuration address register is coupled to inhibit the clocking signal from the configuration address space if a bit (enable flag, enable bit, or value of the enable flag or enable bit) within the configuration register is disabled. Thus, the bit value is monitored and, depending on the value, select portions of the bus interface unit can be disconnected from the clocking signal. Those portions are defined as ones which receive and operate from a clocking signal, henceforth defined as sequential logic. In the second approach, the clock is dynamically enabled and disabled by the configuration cycle detection logic.

The computer may further comprise a CPU and a bus coupled to the CPU. The bus interface unit is coupled to the bus, and includes a configuration address register having a bit written to by the CPU at times when the CPU is addressing an input/output address space. At least one logic gate is further defined within the bus interface unit as having an output and a pair of inputs. The inputs are coupled to receive the clocking signal and the bit within the configuration address register. The output from the logic gate is forwarded to the sequential logic.

The bit within the configuration address register is set or enabled upon receiving a write cycle from the CPU typically during a reset or boot of the computer. The bit can be disabled upon receiving a write cycle from the CPU subsequent to booting or resetting the computer. In the second approach, the clocking is enabled as soon as the detection logic detects a configuration read or write that belongs to its configuration address space.

The present invention yet further contemplates a method for reducing power consumption within a bus interface unit. The method comprises providing a computer having multiple busses between which a bus interface unit resides. A value may be written to a bit location within a configuration register embodied within the bus interface unit. A portion of sequential logic within the configuration register may be disabled if the written value is at a first logic state. The first logic state is commensurate with disabling the enable bit or enable flag so that a configuration cycle cannot be enabled upon a PCI bus coupled to the bus interface unit. However, if the written value is at a second logic state, the bit is set or enabled so as to allow the configuration cycle to occur.

The present invention still further contemplates a method for reducing power consumption within a PCI device. The power to the configuration space of the PCI device is turned off by default. As soon as the detection logic detects a configuration cycle (read or write) headed to its own configuration registers it sets a bit that enables the clocking to the configuration space. Once the configuration cycle is over i.e., write data is stored or read data is delivered, the bit is cleared to disable the clocking to the configuration space.

BRIEF DESCRIPTION OF THE DRAWINGS

Other objects and advantages of the invention will become apparent upon reading the following detailed description and upon reference to the accompanying drawings in which.

Figure 1:
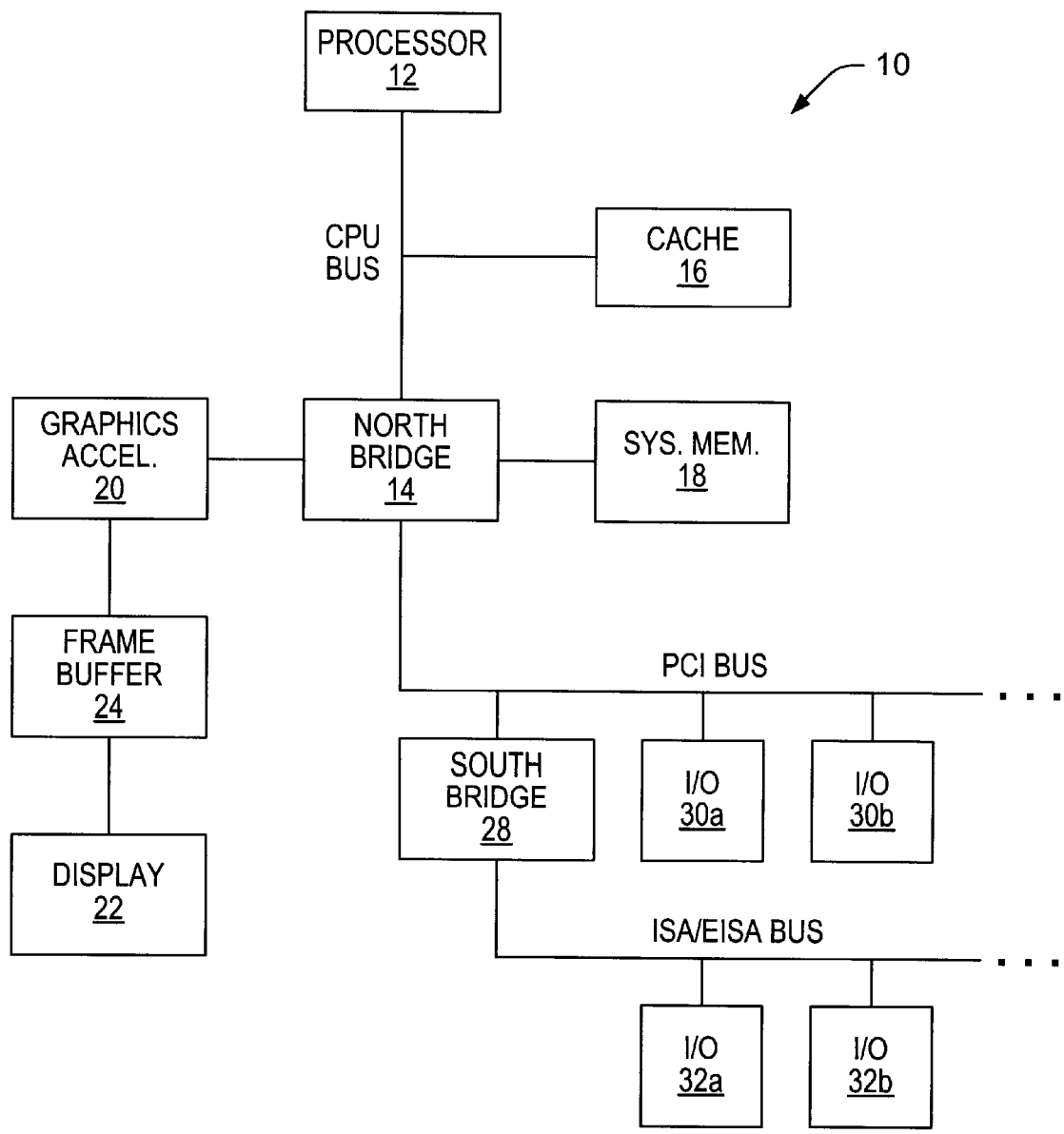
FIG. 1 is a block diagram of a computer system comprising north and south bus bridges.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning to the drawings, FIG. 1 illustrates a computer 10 having multiple buses, including a CPU bus, a mezzanine or PCI bus, and a peripheral bus or ISA/EISA bus. The CPU bus connects a CPU or processor 12 to a bus interface unit or north bridge 14. A cache memory 16 can be embodied within or external to CPU 12.

North bridge 14 provides an interface between components clocked at dissimilar rates. According to one embodiment, north bridge 14 interfaces a slower PCI bus and a faster CPU bus. North bridge 14 may also contain a memory controller which allows communication to and from system memory 18. A suitable system memory 18 comprises DRAM or preferably SDRAM. North bridge 14 may also include a graphics port to allow connection to a graphics accelerator 20. A graphics port, such as the Accelerated Graphics Port ("AGP") provides a high performance, component level interconnect targeted at three dimensional graphic display applications and is based on performance extensions or enhancements to PCI. AGP protocol is generally standard in the industry, the description of which is available from Intel Corporation.

Generally speaking, AGP is physically, logically, and electrically independent of the PCI bus and intended for the exclusive use of a display device 22 coupled to the graphics port (or AGP) by a graphics accelerator 20 and local memory or frame buffer 24. The form and function of a typical graphics accelerator is generally known in the art to render three dimensional data structures which can be effectively shifted into and from system memory 18 to alleviate increased costs of local graphics memory. Frame buffer 24 is generally understood as any buffer which can capture a frame of memory, defined as a still picture. Display 22 is any electronic display upon which an image or text can be presented. A suitable display 22 includes a cathode ray tube ("CRT"), a liquid crystal display ("LCD"), etc.

North bridge 14 is generally considered an application specific chip set, or application specific integrated circuit ("ASIC") that provides connectivity to various buses, and integrates other system functions such as memory interface and P1394. System memory 18 is considered the main memory and refers to a portion of addressable memory that the majority of memory accesses target. System memory 18 is accessed via north bridge 14, and is considered the largest continuous memory space of computer 10.

Unlike the CPU bus which runs at speeds comparable to CPU 12, PCI bus generally runs at speeds of 33 MHz. A south bridge 28 is coupled between the PCI bus and the peripheral bus. Similar to north bridge 14, south bridge 28 is an ASIC or group of ASICs that provide connectivity between various buses, and may also include system functions which can possibly integrate one or more serial ports. Attributable to the PCI bus are input/output ("I/O") devices 30 which require higher speed operation than I/O devices 32.

Figure 2:
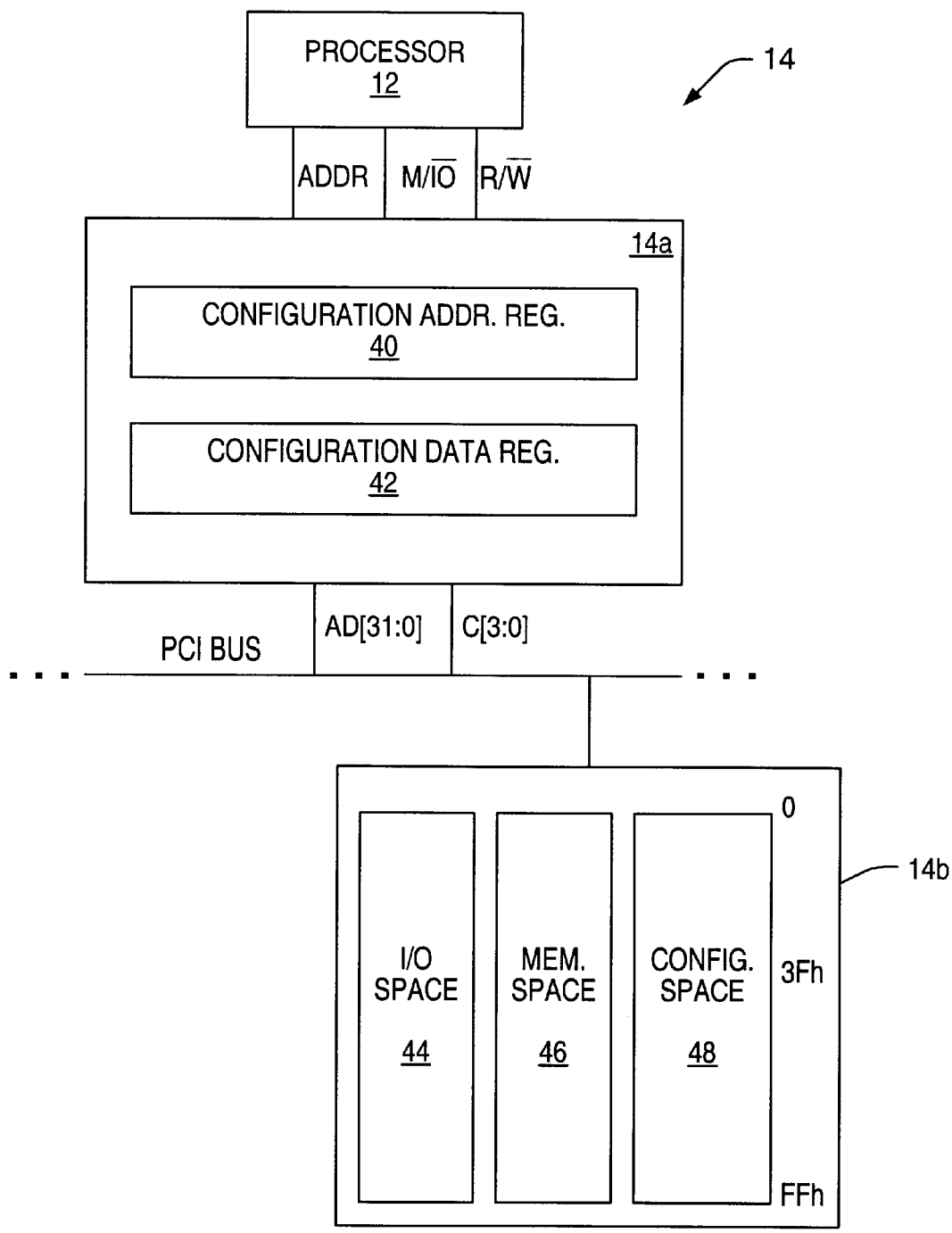
FIG. 2 is a block diagram of the north bridge comprising a configuration space accessible by configuration cycles generated from configuration address and data registers.

Turning to FIG. 2, details regarding north bridge 14 are shown. The various subcomponents of north bridge 14 can be connected upon a monolithic substrate for high end portable computers. North bridge 14 operates in conjunction with south bridge and includes various address spaces, each of which contain a plurality of registers. North bridge 14 is broken into two blocks 14a and 14b according to their address spaces relative to CPU and the PCI bus to which north bridge 14 interfaces. Block 14a indicates an input/output address space to which processor 12 has access. The address space comprises numerous addresses, two of which are occupied by a configuration address register 40 and a configuration data register 42. Block 14 therefore illustrates processor 12 accessing only an input/output address space or a memory address space. However, block 14b indicates configuration accesses upon a PCI bus, whereby a master upon the PCI bus can access an input/output address space 44, a memory address space 46 and a configuration address space 48. A challenge facing systems designers is the conversion of pre-defined I/O accesses into configuration accesses on the PCI bus. Therefore, translation between the CPU I/O accesses into configuration space 48 must occur if the PCI devices including north bridge 14 are to be configured during system initiation.

A typical x86 processor family is capable of addressing up to, but no more than, 64 KB of I/O address space. Moreover, a typical PCI device, such as north bridge 14, requires implementation of approximately 128 bytes of configuration registers. If the configuration registers within configuration space 48 were implemented in the CPU I/O address space, all available I/O addresses would be quickly consumed. To alleviate this problem, the configuration registers within configuration space 48 are translated from the CPU I/O address space by north bridge 14.

When CPU performs an I/O write to register 40 at I/O address OCF8h, all of the pure host/PCI bridges should latch the data into the respective configuration address registers. In order to prevent contention on the CPU ready line, only one of the bridges 14 (if multiple bridges are encountered) should control the CPU ready lines in the transfer. Each of the bridges then compares the target bus number to the bus number of its secondary PCI bus and to the number of the most subordinate PCI bus within its hierarchy. If the target bus does not reside within a bridge 14, the bridge will not convert subsequent accesses of its configuration data register 42 to PCI configuration accesses.

A subsequent read or write access to configuration data register 42 at I/O address OCFCh will only be accepted by north bridge 14 that has a compare on the target bus number. Bridge 14 will control the CPU ready lines in the bus cycle. When an access is made to configuration data register 42, bridge 14 with a bus compare will test the state of an enable flag or enable bit in configuration address register 40. If enabled or set, bridge 14 will convert the CPU bus I/O access to a PCI configuration access. Further details regarding the enable flag or enable bit within register 40, and the translation to the PCI address bus will be described below.

Associated with the CPU bus which links processor 12 to the input/output space of block 14a are multiple conductors comprising address lines, memory input and output line (M I/O) and a read/write (R/W) line. Whenever the address, input/output and write lines are active, the CPU input/output address space is accessed. If the address asserted is OCF8h, then register 40 will be written to by processor 12. Contained within the PCI bus are address and data lines (AD) and control lines (C). If the enable bit within register 40 is set, whatever is contained within register 40 will be dispatched upon the AD lines if registers 42 are written to or read from. The processor 12 can either write to or read from spaces 40, 46 and 48 depending on the status of the bits within the control lines or command lines C. For example, if processor 12 writes to registers 40 and the enable flag is set, then control line bits of 1011 establishes a write from register 40 to configuration space 48. In a subsequent configuration cycle, data within data registers 42 are dispatched to the addressed space within configuration space 48.

Figure 3:
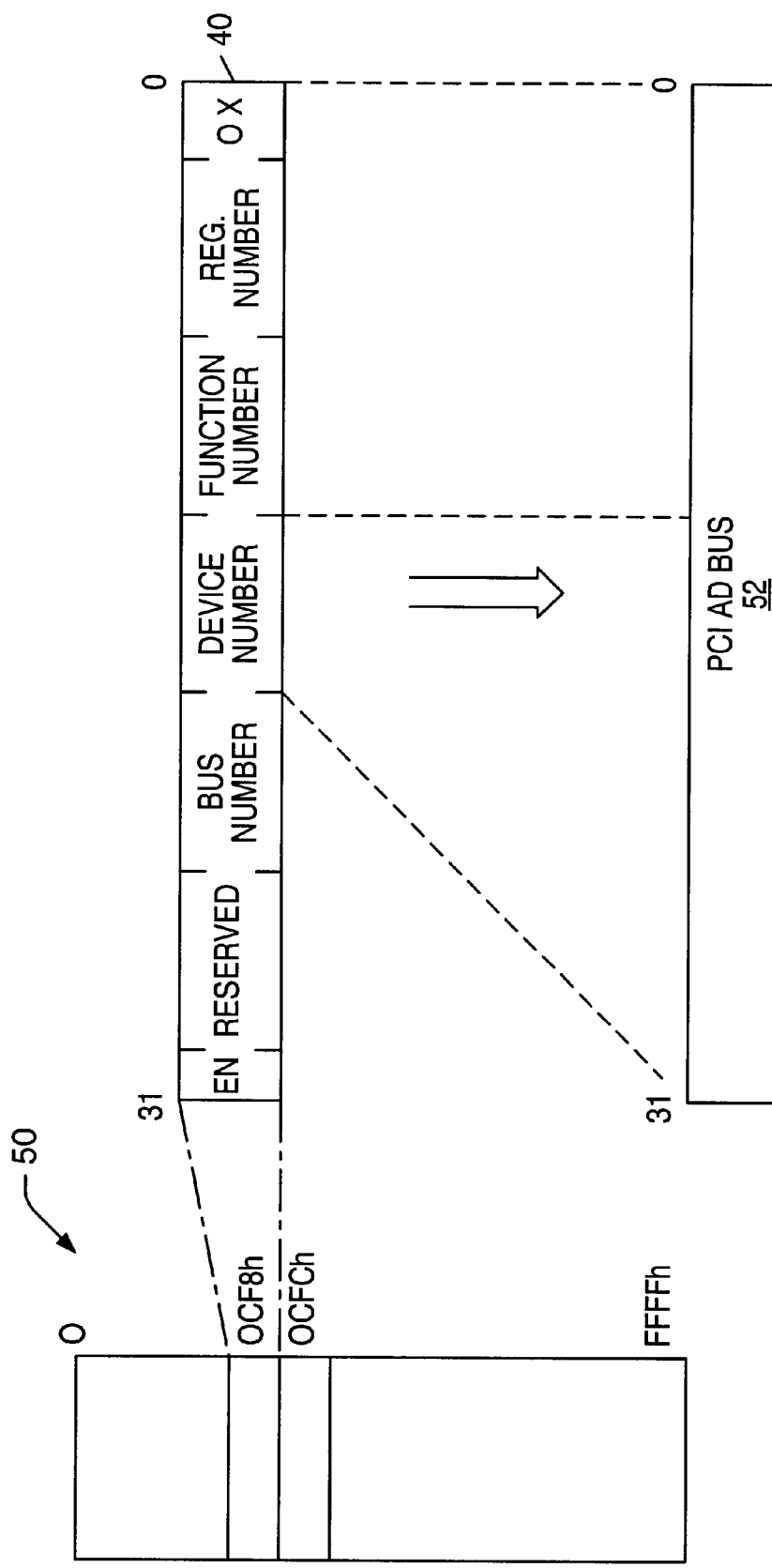
FIG. 3 is a block diagram of the configuration address register shown in relation to an input/output address space of the CPU, wherein the configuration address register contains an enable bit and numerous other bits which can be translated to the PCI address bus if the enable bit is set.

Referring to FIG. 3, a mechanism is shown for translating specific CPU I/O accesses within a I/O address space 50 into PCI configuration accesses on PCI bus 52. I/O address space 50 comprises 64 KB (FFFFh), of which two double words are reserved for configuration address register 40 and configuration data register 42 (shown in FIG. 2). Illustrated in greater detail is the configuration address register 40 occupying I/O addresses OCF8h through OCFBh. Configuration data register 42 (shown in FIG. 2) occupies I/O addresses OCFCh through OCFFh.

Referring to FIGS. 2 and 3 in combination, accessing one of the configuration registers within configuration space 48 is a two step process. First, the CPU writes the bus number, physical device number, function number and register number to location OCF8h occupied by configuration address register 40. Secondly, an input/output read or write must occur to the configuration data register 42 at input/output address OCFCh. Configuration address register 40 only latches data when CPU data performs a full 32-bit write to the register. Any 8 or 16 bit accesses within the double word will be passed directly to the PCI bus as an 8 or 16 bit PCI bus I/O access. When preparing to perform a configuration access, the 32 bits of data written to address register 40 consist of bits 0 and 1 which are typically "00" or "01", depending on the type of translation occurring. Bits 2 through 7 identify the double word address of the target functions' configuration register. Bits 8 through 10 identify the function (one of eight within a PCI device). Bits 11 through 15 identify the physical PCI device number (one of thirty-two). Bits 16 through 23 identify the PCI bus number (one of two hundred and fifty six) and bit 31 is the enable flag or enable bit. If the enable flag is set to a logic "one" value, then translation of the subsequent CPU bus I/O access to the configuration data register is enabled into a configuration access on the PCI bus. Essentially, if enabled, north bridge 14 will convert the CPU bus I/O access to a PCI configuration access. If the target bus is the north bridge 14 secondary bus, north bridge 14 will convert the access to a type zero configuration access on its PCI bus. If the target bus is subordinate to (lower in the hierarchy) north bridge 14 PCI bus, north bridge 14 will convert the configuration data register access to a type one PCI configuration access on its secondary bus. The type zero and type one configuration accesses are generally well known to those skilled in the art and called out in the PCI system architecture FIG. 3 illustrates a type zero translation. When north bridge 14 sees an I/O access that falls inside the double word beginning at the configuration data register address, it checks the enable bit 31 within configuration address register 40 as well as the bus number contained therein. If configuration cycle translation is enabled and the bus number matches the north bridge bus number or any bus number behind north bridge 14, then a configuration cycle translation must be done. For type zero translations, bridge 14 does a decode of the device number field set forth in bit locations 11 through 15 to assert the appropriate AD[31::11] line which is used by PCI devices as an IDSEL line, and performs a configuration cycle on the PCI bus where the address data (AD) locations 1::0 equals "0 0". Bits 8 through 10 of address register 40 are copied to AD [10::8] on the PCI bus as an encoded value which may be used by components which contain multiple functions. AD [7::2] are also copied from address register 40. For type one translations, bridge 14 directly copies the contents of address register 40 into the PCI AD line during the address phase of a configuration cycle making sure that AD [1::0] is "01".

Figure 4:
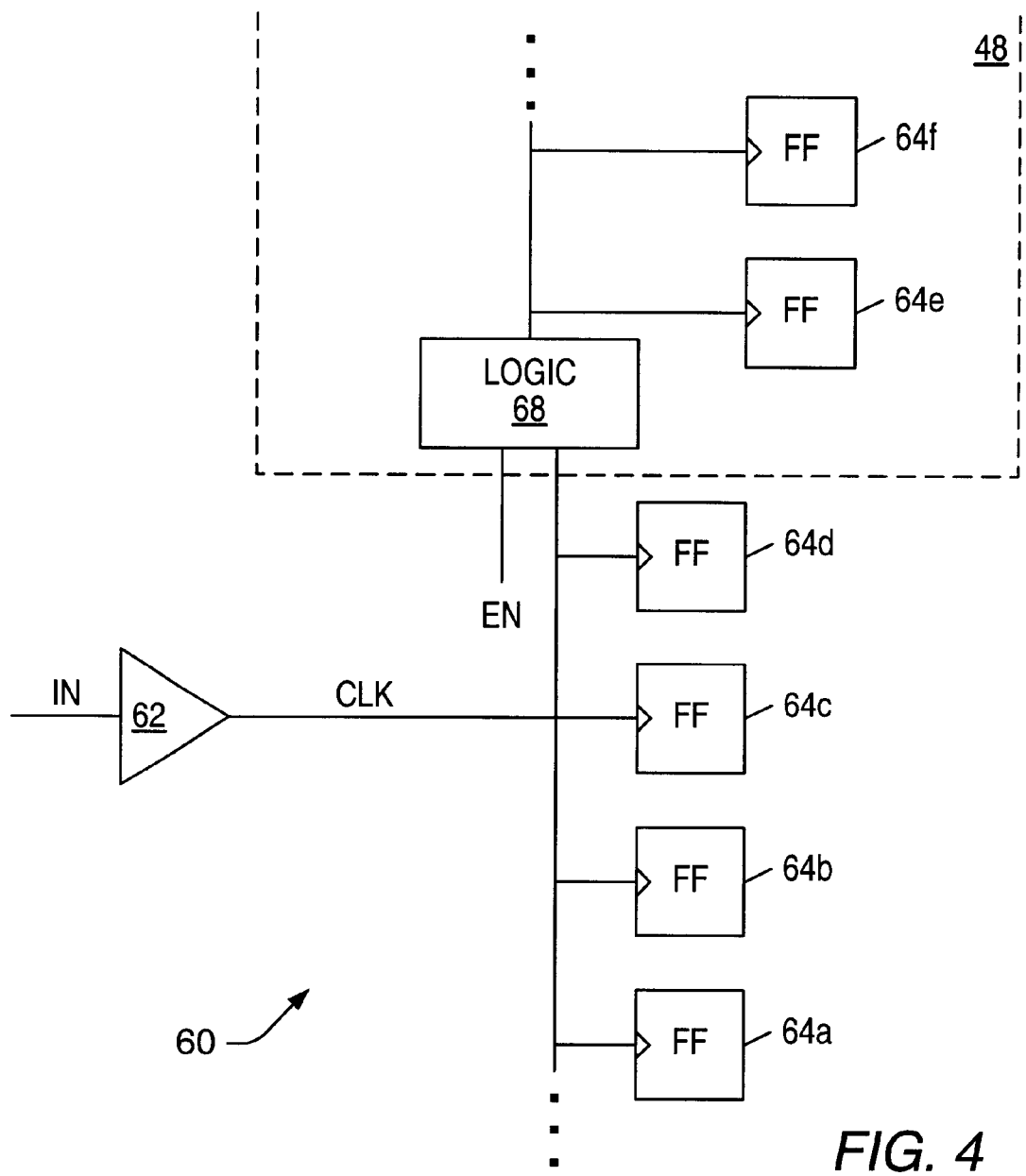
FIG. 4 is a block diagram of sequential logic embodied within the configuration address space of the north bridge, wherein the sequential logic is responsive to a clocking signal which can be disconnected from the sequential logic if the enable bit is not set.

Referring to FIG. 4, a clock tree 60 is shown. Clock tree 60 comprises a driver 62 which drives a clocking signal into the north bridge or generates the clocking signal from driver 62 exclusively within the north bridge. The clocking signal (CLK) is sent throughout branches of the clock tree to various circuits which perform sequential logic. The circuits include flip-flops or latches labeled as reference numerals 64. North bridge 14 may contain a substantial quantity of sequential logic partitioned in part between the input/output space 44, memory space 46 and configuration space 48 (shown in FIG. 2). Sequential logic attributed to the configuration space is labeled as 64e and 64f. Logic 64e and 64f need be clocked only at times when the PCI device is being configured—typically only during computer 10 initialization or boot up. Subsequent to boot up, sequential logic 64e and 64f is disconnected or inhibited from receiving the clocking signal based on the value of the enable flag at bit location 31 of address register 40.

The enable flag is advantageously routed from register 40 (shown in FIGS. 2 and 3) to one or more logic gates within logic block 68 (shown in FIG. 4). Logic block 68 receives two inputs, defined as the enable flag input and the clocking signal input. If the enable flag is disabled, deasserted, or is at a logic "0" value, then logic block 68 responds by removing transitions from the clocking input to sequential logic 64e and 64f. Conversely, if the enable flag is set, enabled, asserted or at a logic "1" value, then the clocking signal will be translated or retained to the clocking inputs of sequential logic 64e and 64f.

Figure 5:
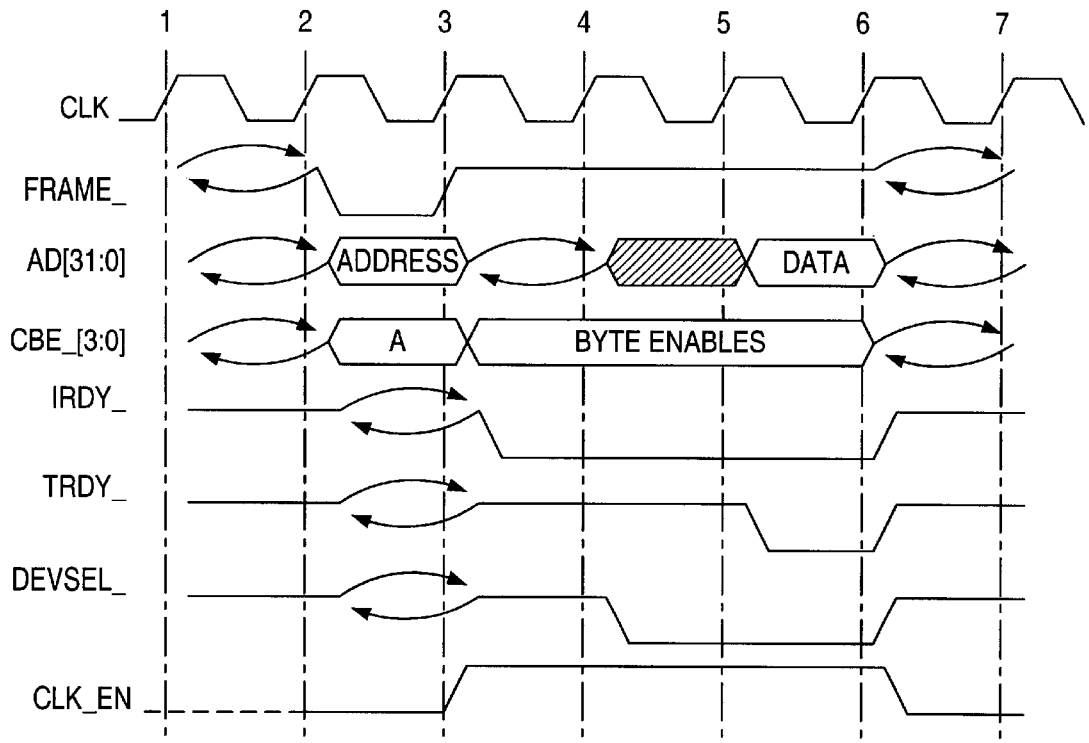
FIG. 5 is timing diagram that shows a configuration read cycle in relation to the internally generated clock enable signal (CLK__EN)

Referring to FIG. 5, a PCI device on the third clock transition samples the IDSEL, AD[31:0], and CBE_[3:0] signals and determines that the current cycle is a configuration read cycle (depicted by a value of "A" hexadecimal on the CBE[3:0] bus) that targets its internal configuration space. As a result, the PCI device enables the configuration space clocking by setting CLK_EN on clock number three. A wait state is added on clock four to insure that the configuration space clock enabled by CLK_EN is stable. On clock five, the PCI device asserts TRDY_ to indicate that the data is available on the AD bus. On clock six, the PCI device samples both IRDY_ and TRDY_ asserted which indicates the data phase is over. At this point the PCI device disables the configuration space clocking by negating CLK_EN on clock six.

Figure 6:
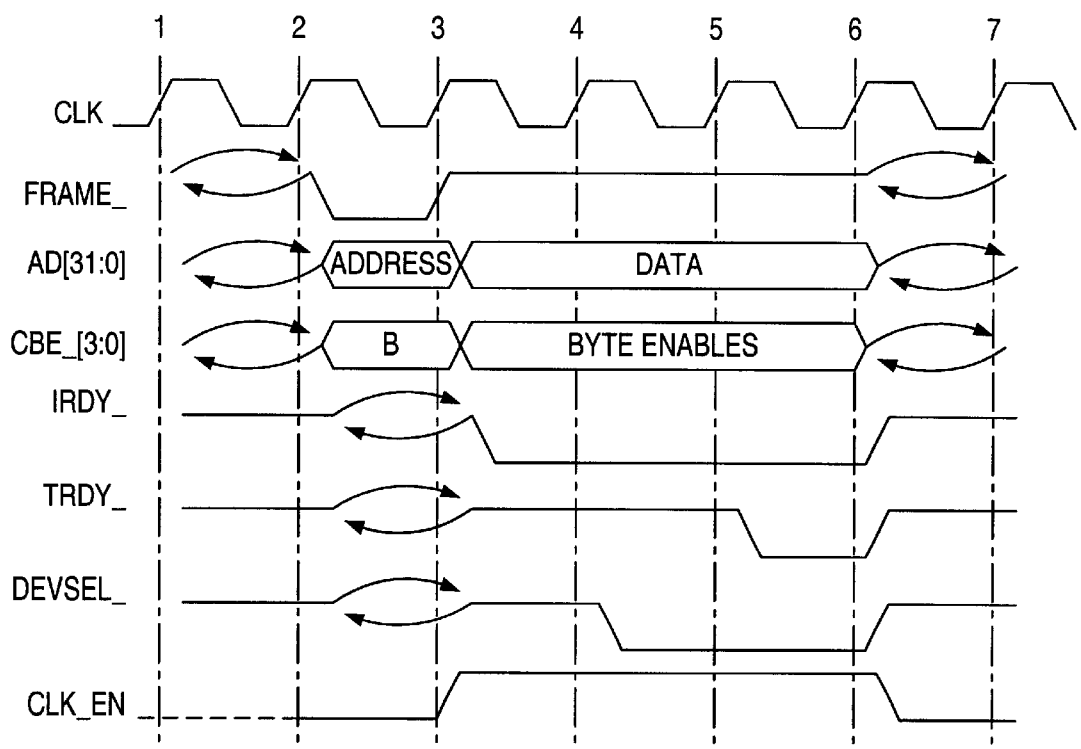
FIG. 6 is timing diagram that shows a configuration write cycle in relation to the internally generated clock enable signal (CLK__EN).

Turning to FIG. 6, a PCI device on clock three samples the IDSEL, AD[31:0], and CBE_[3:0] signals and determines that the current cycle is a configuration write cycle (depicted by a value of "B" hexadecimal on the CBE[3:0] bus) that targets it's internal configuration space. As a result the PCI device enables the configuration space clocking by setting CLK_EN on clock three. A wait state is added on clock four to insure that the configuration space clock enabled by CLK_EN is stable. On clock five the PCI device asserts TRDY_ to indicate that the data is available on the AD bus. On clock six the PCI device samples both IRDY_ and TRDY_ asserted which indicates the data phase is over. At this point the PCI device disables the configuration space clocking by negating CLK_EN on clock six.

It will be appreciated by those skilled in the art having the benefit of this disclosure that this invention is believed to be capable of minimizing power consumption after the computer system is initiated, typically after system boot up and/or BIOS operation because the configuration space is no longer clocked. The enable flag and/or bit within the configuration address register is enabled in software during configuration, possibly through a CPU write operation which may arise from a BIOS operation from non-volatile memory. The enable flag or bit can subsequently be disabled through either a time-out operation or by re-writing that bit from the CPU. Once disabled, subsequent configurations cannot occur and, equally important, the configuration address space within the north bridge and sequential logic therein can be disconnected from a clocking signal to minimize power consumption of the north bridge. In most instances, the enable flag and/or bit is disabled except during system boot up. Disabling the enable bit to minimize power consumption therefore beneficially occurs throughout most of the portable computer run state. Using the second approach, the clocking to the configuration space of the PCI device is automatically disabled as soon as the configuration cycle is done minimizing the power used by the configuration space within the PCI device. Various modifications and changes may be made as would be obvious to a person skilled in the art having the benefit of this disclosure. It is intended that the following claims be interpreted to embrace all such modifications and changes and, accordingly the specification and drawings are to be regarded in an illustrative rather than a restrictive sense.

What is claimed is:

1. A computer, comprising:

an electronic display;

a bus interface unit in operable communication with the electronic display, wherein the bus interface unit includes:

a configuration address space, memory address space and input/output address space;

a clocking signal; and a configuration address register configured to inhibit the clocking signal from the configuration address space if a bit within the configuration address register is disabled, wherein said bit comprises a flag, the disabled status of which is forwarded to a logic gate within the bus interface unit to disconnect the clocking signal from the configuration address space.

2. The computer as recited in claim 1, wherein said bus interface unit is coupled between a central processing unit (CPU) bus a nd a peripheral component interface (PCI) bus.

3. The computer as recited in claim 1, wherein said configuration address space comprises sequential logic coupled to receive the clocking signal if the bit within the configuration address register is enabled.

4. The computer as recited in claim 1, wherein the bit within the configuration address register is enabled upon receiving a write cycle from a central processing unit (CPU) within the computer.

5. The computer as recited in claim 1, wherein said configuration address space comprises:

first sequential logic arranged within the confines of said bus interface unit at least partially separate from second sequential logic within the confines of said memory address space and said input/output address space; and at least one logic gate, upon receiving a disabled said bit, inhibits the clocking signal from the first sequential logic and retains the clocking signal to the second sequential logic.

6. The compu ter as recited in claim 2, wherein said configuration address space comprises approximately 256 addresses selectable by an address forwarded across the PCI bus.

7. The computer as recited in claim 4, wherein the bit within the configuration address register is enabled during times when the CPU is executing from a non-volatile memory within the computer at times when the computer is reset.

8. A computer, comprising a bus interface unit which includes a configuration address space, memory space or input/output space, a clocking signal, and clock inhibit logic that inhibits the clocking signal to the configuration address space during times in which accesses to the configuration address space are absent, wherein the clock inhibit logic adds a wait state on a peripheral component interface (PCI) bus coupled to the bus interface unit to allow the clocking signal to stabilize before data is transferred to or from the configuration space registers.

9. The computer as recited in claim 8, wherein said bus interface unit is coupled between a peripheral component interface (PCI) and input/output space (I/O) or memory space.

10. The computer as recited in claim 8, wherein, upon completion of a configuration cycle following boot-up or reset, said clock inhibit logic completely disables clocking to the configuration address space and does not re-enable clocking until said computer undergoes boot-up or reset again.

11. The computer as recited in claim 9, wherein said configuration space comprises approximately 256 addresses selectable by an address forwarded across the PCI bus.

12. The computer as recited in claim 11, wherein said clock inhibit logic monitors the PCI bus activity for configuration cycles that target the configuration address space.

13. The computer as recited in claim 12, wherein the said clock inhibit logic enables the clocking to the configuration address space if a current configuration cycle targets the configuration address space.

14. The computer as recited in claim 12, wherein the said clock inhibit logic disables clocking to the configuration address space after the data is transferred to or from the configuration registers.

\* \* \* \* \*